United States Patent [19]

Felner

[11] 3,731,308

[45] May 1, 1973

[54] SUBAUDIBLE FREQUENCY INDICATOR FOR DOPPLER RADAR

[75] Inventor: Richard S. Felner, Barnegat, N.J.

[73] Assignee: The United States of America as represented by the Secretary of the Army

[22] Filed: June 10, 1971

[21] Appl. No.: 151,662

[52] U.S. Cl..............................343/7.7, 343/8
[51] Int. Cl..............................G01s 9/42, G01s 9/44
[58] Field of Search..................................343/7.7, 8

[56] References Cited

UNITED STATES PATENTS

| 3,657,561 | 4/1972 | Riekers | 343/8 X |
| 3,587,097 | 6/1971 | Stull, Jr. | 343/7.7 X |
| 3,046,548 | 7/1962 | Briskin | 343/7.7 |

Primary Examiner—Malcolm F. Hubler
Attorney—Harry M. Saragovitz, Edward J. Kelly, Herbert Berl and Charles F. Gunderson

[57] ABSTRACT

This invention relates to doppler-radar indicating systems and particularly to a system for detecting and indicating doppler beat frequencies in the extremely low frequency range. In this system, a series of lights are actuated by relatively small changes in voltage to clearly indicate a very-slowly-changing alternating voltage.

7 Claims, 1 Drawing Figure

Patented May 1, 1973
3,731,308
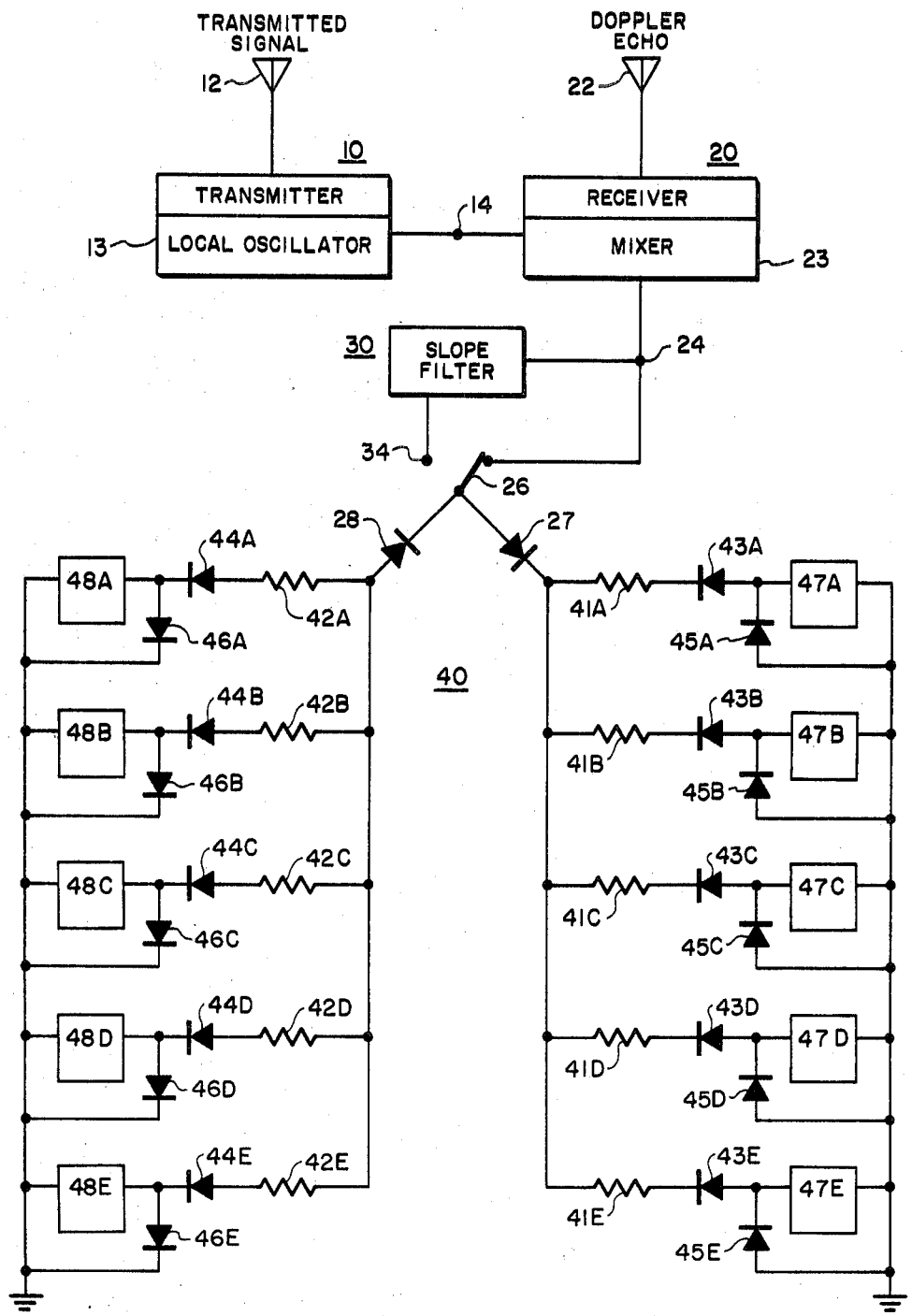

SUBAUDIBLE FREQUENCY INDICATOR FOR DOPPLER RADAR

BACKGROUND OF THE INVENTION

Doppler systems are very well known, and, in regard to radar, rely on the increase or decrease of the frequency of a reflected radar signal as the reflecting target moves towards or away from the transmitter. The reflected signal is received, its frequency is compared with that of the original transmitted wave, and, if there is any motion of the target with respect to the transmitter, the difference in frequencies will produce a beat frequency that is a function of the motion of the target and the frequency of the transmitted signals.

Unfortunately, some of the motion of the target that it is desirable to detect is very slow with respect to the velocity of radio waves and some of the beat frequencies that are of most interest can be in the low audible or subaudible ranges, which impose special problems in detection. In the low audible ranges, headphones can be used by an observer or audio-frequency filters can be used, tuned to the frequencies of interest.

Below these audible frequency ranges, other means must be used to translate the subaudible frequencies to audible or otherwise detectable signals. In one system a carrier frequency — of say 400 cycles — can be modulated by a subaudible, beat frequency to produce a warble that can be recognized because of the sensitivity of the ears to frequency changes in that frequency range.

Another system includes the recording of a subaudible signal at a low speed and playing it back at a high enough speed to produce an audible signal. Still other systems detect the zero crossings of the half cycles of the doppler beat-frequency signals and provide a series of tones or audible clicks at each of the half cycles of the beat-frequency signal.

The lower the frequency of the doppler beat-frequency signals, the less effective the systems become and even the zero-crossings detection system becomes unreliable at frequencies of a low fraction of a cycle per second. Another limitation is that none of the systems readily indicates, initially, the direction a target starts to move, which can be of considerable importance.

It is therefore an object of this invention to provide an improved system for detecting subaudible beat-frequency signals from a doppler-radar system.

It is a further object of this invention to provide a system for indicating variations in the order of fractions of a cycle per second in the beat-frequency signals produced by a doppler system.

SUMMARY OF THE INVENTION

These and other objects are accomplished by receiving a reflected signal from a target and mixing it with a sample of the original, transmitted signal so that any doppler change in the frequency of the reflected signal will produce a beat-frequency signal corresponding to any movement of the reflecting target relative to the transmitter. The beat-frequency signal is applied to an indicating detector comprising a series of circuits sensitive to increasing voltage which, in turn, actuate a series of indicators, such as lamps, to show any change in the voltage of the beat-frequency signal in either a positive or a negative direction. Since this indicating detector is sensitive to changes in voltage instead of changes in frequency — or zero crossings of the beat-frequency signal — each half cycle of the doppler beat-frequency signal can produce as many indications as desirable to clearly show any motion of the target.

BRIEF DESCRIPTION OF THE DRAWINGS

The drawing is a block and circuit diagram of a typical, doppler, radar system and indicators in accordance with this invention.

DESCRIPTION OF THE PREFERRED EMBODIMENT

Referring now to the drawing, a transmitter 10 has an antenna 12 for transmitting a signal to a target — not shown — in any desired direction. The reflected signal from the target is received by an antenna 22 on a receiver 20.

The transmitter 10 includes a very-stable local oscillator 13 and the receiver 20 includes a mixer 23 for combining a signal from an output 14 of the local oscillator 13 with the reflected signal in the receiver. If there is a difference in these two frequencies, the mixer will produce a beat-frequency signal at 24 which can be applied to either a slop filter 30 or directly, to the doppler, beat-frequency indicator 40. A switch 26 connects the indicator 40 to either the beat-frequency signal at 24 or the output of the slope filter at 34.

The detector and indicator 40 consists of a series of voltage sensitive networks. These networks each include a decoupling resistor such as 41A or 42A, a polarity and voltage sensing combination of diodes such as 43A and 45A or 44A and 46A, and a voltage-actuated indicator means such as 47A or 48A. The diodes 43 to 46 are zener diodes that have a very-precise, reverse-breakdown, voltage level. The odd-numbered networks are sensitive to positive-going voltages and the even-numbered networks are sensitive to negative-going voltages.

A diode 27 applies the positive-going voltages to, and blocks the negative-going voltages from, the odd-numbered networks; and a diode 28 applies the negative-going voltages to, and blocks the positive-going voltages from, the even-numbered networks.

The networks all include the same elements but each combination of diodes is chosen to provide a different reverse-breakdown, voltage-sensing level at the junction of the diodes. Each combination of diodes will actuate a corresponding one of the indicator means in response to a different voltage level.

In operation, as the instantaneous voltage of the beat-frequency signal increases during the positive half cycle of the alternating current waveform, the corresponding indicators 47A through E are successively actuated, until the positive peak voltage is reached. As the instantaneous voltage decreases, the indicators are successively cut off in the reverse order. When the voltage of the alternating current waveform goes from positive to negative and increases negatively, the indicators 48A through E are successively actuated until the negative peak voltage is reached, and then cut off, in the reverse order, as the voltage returns to zero.

If the transmitted signal and the echo signal reflected from a particular target are, initially, synchronized, any movement of the target will shift the phase of the reflected signal, to produce a voltage at the mixer output connection 24. The signals can be synchronized such that, if the target moves toward the transmitter, the phase shift of the waveforms of the transmitted and reflected signals can produce an increasing positive voltage. Conversely, if the target moves away from the transmitter, the phase shift can produce an increasing negative voltage. If the target stops moving the will be no change in the voltage level. If the target reverses, the direction of change of the voltage indicators will also reverse.

The maximum level of the voltage indicators will normally be set for the maximum, predicted, peak voltage of the beat-frequency signals. The intermediate voltage indicators can be scaled between zero and maximum voltage in a linear voltage scale or in a sine wave pattern for more linear indication of phase shift and movement of target.

The difference in voltage levels of adjacent indicators can be set to an extremely small change in voltage. The diodes can be hand picked for more-precise levels of voltage sensitivity, or other circuitry, well known in the art, can be added to calibrate or adjust the precise level of sensitivity of each of the combinations of diodes in each of the indicators.

The smaller the difference between the voltage levels of adjacent indicators, the greater the number of indicators that will be needed to accommodate a given peak voltage range in either direction. More indicators would, of course, give more sensitivity to target motion. While only 5 indicators have been shown here for simplicity, it is obvious that any order of indicators, within practical limits, can be added to increase the sensitivity of this device.

This low-frequency, doppler indicator will be sensitive to all ranges of frequencies, but will be particularly effective for detecting frequencies of smaller fractions of a cycle per second, or a movement of a target that produces only a slight phase shift — less than one cycle — in the mixer output.

Frequencies above a few cycles per second would become difficult to identify, visually, but are in a range that can be separated by an electronic filter, such as the slope filter 30. This filter is designed to produce a d-c output voltage directly proportional to the frequency of an alternating-current input signal over a given range. The number of indicators that are actuated will now be a function of the frequency of the doppler signal over the effective range of the filter. The best frequency is, of course, proportional to the velocity of the target with respect to the transmitter, and the velocity can be calibrated to read directly.

The actual indicators 47 and 48 may be of any type that can be made to give a detectable response to an actuating voltage appearing at the junctions of the appropriate combinations of diodes. The indicators 47 and 48 may give a direct indication or they may include amplifiers and other electronic circuitry to provide more sensitivity to the actuating voltage or more power for a stronger indication.

In a typical embodiment according to this invention, the transmitted signals are in the order of 1,000 megahertz. The resistors 41 and 42 are 8.2K ohms; the diodes 43 and 44A through E are IN3822A, IN3827A, IN3016B, IN3018B and IN3020B respectively; the diodes 45 and 46A through E are IN3825A, IN3823A, IN3017B, IN3019B and IN3022B respectively. The indicators are electric lamps actuated by a 2N2219 transistor and energized by a 12 volt power supply.

The frequency range of the slope filter can be changed to accommodate various ranges of beat frequencies, or multiple slope filters and corresponding switches can be provided to accommodate the various ranges.

While the invention has been described in connection with an illustrative embodiment, obvious modifications thereof are possible without departing from the spirit of the invention. Accordingly, the invention should be limited only by the scope of the appended claims.

What is claimed is:

1. A doppler-radar detector and indicator comprising a source of radio frequency signals;
   means for transmitting said radio frequency signals;
   means for receiving echo signals of said radio frequency signals reflected from a target;
   means for combining said radio frequency signals and said echo signals to produce doppler beat-frequency signals, said means for combining having an output;
   a plurality of voltage-sensitive detectors, each one comprising the series combination of a first diode and a second diode;
   means for connecting each of said series combinations of voltage-sensitive detectors across the output of said means for combining said radio frequency and echo signals;
   a voltage-sensitive indicating means connected to a corresponding one of each of the junctions of said first and second diodes of said series combinations; and
   each of the diodes of each of said series combinations being chosen to provide a different voltage level of sensitivity at each of said junctions of said diodes to respond to a different level of voltage of said doppler, beat-frequency signals.

2. A doppler-radar detector and indicator as in claim 1 wherein said first and second diodes are zener diodes.

3. A doppler-radar detector and indicator as in claim 1 wherein said means for combining said radio frequency signals and said echo signals to produce doppler, beat-frequency signals comprises a mixer having an output.

4. A doppler-radar detector and indicator as in claim 3 having an electrical slope filter connected across the output of said mixer, said filter having an output; and switching means for connecting said series combinations of voltage-sensitive detectors to the output of said electrical slope filter.

5. A doppler-radar detector and indicator as in claim 3 wherein each of said junctions consists of one polarity of one of said first diodes and the other polarity of one of said second diodes of said series combinations.

6. A doppler-radar detector and indicator as in claim 3 wherein said plurality of voltage-sensitive detectors comprise a first series having the diodes in its series combination in one polarity with respect to ground, and a second series having the diodes in its series combination in the other polarity with respect to ground.

7. A doppler-radar detector and indicator as in claim 6 wherein said means for connecting said series combinations of voltage-sensitive detectors across the output of said mixer comprise a third diode of said other polarity for connecting said first series of voltage-sensitive detectors across the output of said mixer, and a fourth diode of said one polarity for connecting said second series of voltage-sensitive detectors across the output of said mixer.

* * * * *